US012600197B2

(12) United States Patent (10) Patent No.: US 12,600,197 B2

Wolfe et al. (45) Date of Patent: Apr. 14, 2026

(54) HVAC MODULE

(71) Applicant: MAHLE International GmbH, Stuttgart (DE)

(72) Inventors: Edward Wolfe, Clarence Ctr., NY (US); Bailey Reid, Lockport, NY (US); Steve Zielinski, North Tonawanda, NY (US); Richard Baranowski, Lake View, NY (US)

(73) Assignee: MAHLE INTERNATIONAL GMBH (DE)

( * ) Notice: Subject to any disclaimer, the term of this patent is extended or adjusted under 35 U.S.C. 154(b) by 461 days.

(21) Appl. No.: 18/127,246

(22) Filed: Mar. 28, 2023

(65) Prior Publication Data

US 2023/0347715 A1 Nov. 2, 2023

Related U.S. Application Data

(60) Provisional application No. 63/324,890, filed on Mar. 29, 2022.

(51) Int. Cl.
B60H 1/00 (2006.01)
B60H 3/06 (2006.01)

(52) U.S. Cl.
CPC ..... B60H 1/00842 (2013.01); B60H 1/00514 (2013.01); B60H 3/0608 (2013.01)

(58) Field of Classification Search
USPC .................................................. 454/69–165
See application file for complete search history.

(56) References Cited

U.S. PATENT DOCUMENTS

| | | | |
|---|---|---|---|
| 9,676,245 B2 | 6/2017 | Clemence | |
| 10,427,489 B2 | 10/2019 | Lee | |
| 10,464,390 B2 | 11/2019 | Sekito | |
| 11,833,881 B2 | 12/2023 | Pierres | |
| 2012/0214394 A1* | 8/2012 | Kanemaru | ......... B60H 1/00678 |
| | | | 454/139 |
| 2014/0065943 A1* | 3/2014 | Clemence | ................ B60H 1/24 |
| | | | 454/236 |
| 2018/0170147 A1* | 6/2018 | Wright | ................ F04D 29/4213 |
| 2019/0270359 A1 | 9/2019 | Kato | |
| 2019/0315196 A1* | 10/2019 | Lee | ........................ B60H 1/241 |

FOREIGN PATENT DOCUMENTS

| | | |
|---|---|---|
| EP | 3524452 A1 | 8/2019 |
| FR | 3022987 B1 | 1/2016 |
| FR | 3069489 B1 | 2/2019 |
| FR | 3069616 B1 | 2/2019 |
| FR | 3072054 B1 | 4/2019 |

* cited by examiner

*Primary Examiner* — Ko-Wei Lin

(74) *Attorney, Agent, or Firm* — Fishman Stewart PLLC

(57) ABSTRACT

A heating, ventilation, and air conditioning (HVAC) module includes an air inlet, a first valve, a second valve, and a third valve. The air inlet includes a first inlet portion that receives a first input air and a second inlet portion to receive a second input air. The blower is in communication with the air inlet. The blower includes a first airflow section and a second airflow section. The first valve is disposed in the inlet and controls flow of the first input air and the second input air through the first airflow section. The second valve is disposed adjacent to the first valve and is configured to control flow of the first input air and the second input air through the second airflow section. The third valve is disposed in the second valve and selectively restricts leakage of the first input air into the first airflow section.

20 Claims, 10 Drawing Sheets

20

50   30

60

70

82

80

60'

92

70'

90

40

-------------------- 122
———————————— 120

HVAC MODULE

CROSS-REFERENCE TO RELATED APPLICATIONS

This application claims the benefit of and priority to U.S. Provisional Patent Application Ser. No. 63/324,890, filed on Mar. 29, 2022, the disclosure of which is hereby incorporated by reference in its entirety as though fully set forth herein.

TECHNICAL FIELD

The present disclosure generally relates to heating, ventilation, and air conditioning (HVAC) modules that may, for example, be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some HVAC modules do not provide sufficient functionality and/or are not configured to compensate for a vehicle that generates high pressures in a cowl of the vehicle and/or an air inlet of the module.

There is a desire for solutions/options that minimize or eliminate one or more challenges or shortcomings of HVAC modules. The foregoing discussion is intended only to illustrate examples of the present field and is not a disavowal of scope.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
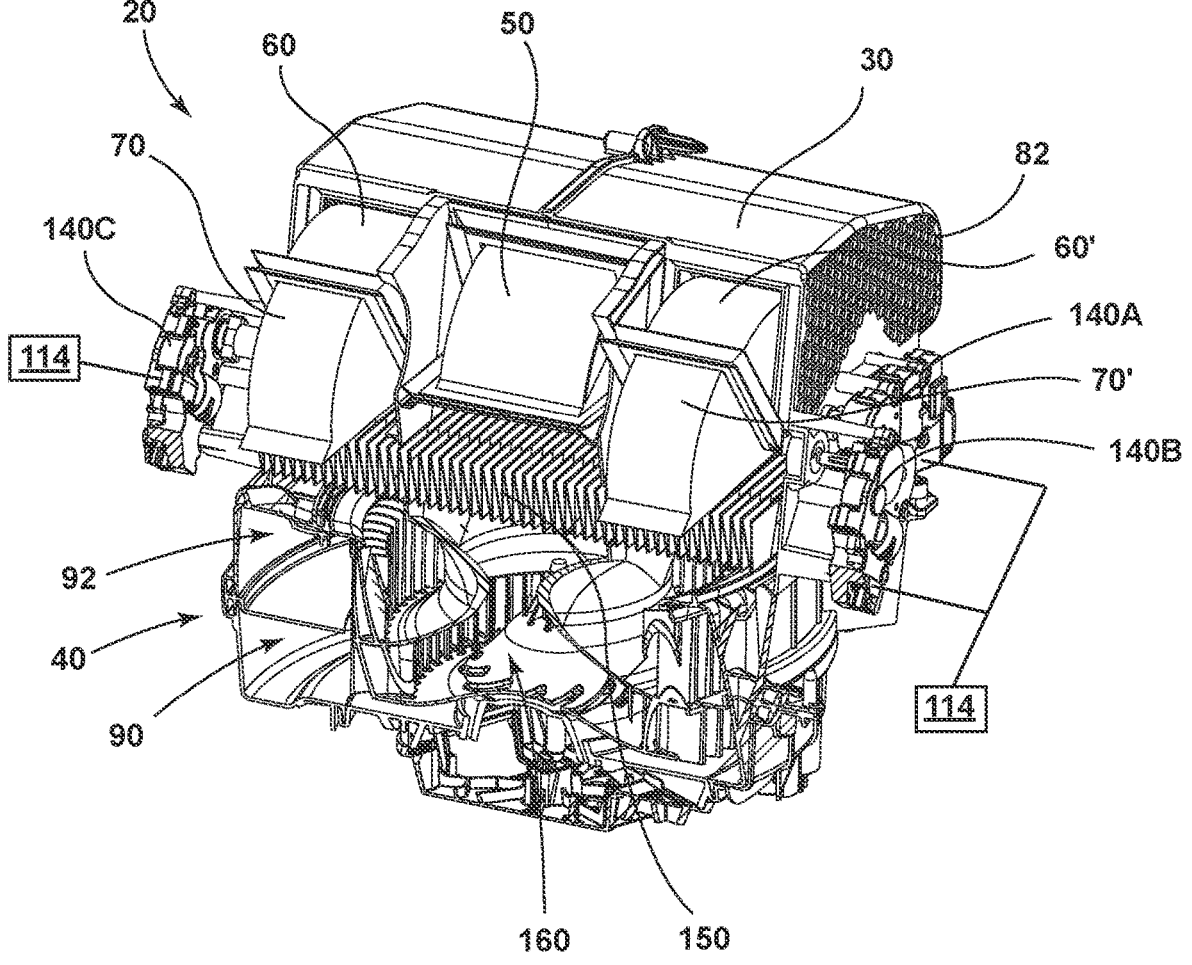
FIG. 1 is a cross-sectional perspective view generally illustrating an embodiment of an HVAC module according to teachings of the present disclosure.
Figure 2:
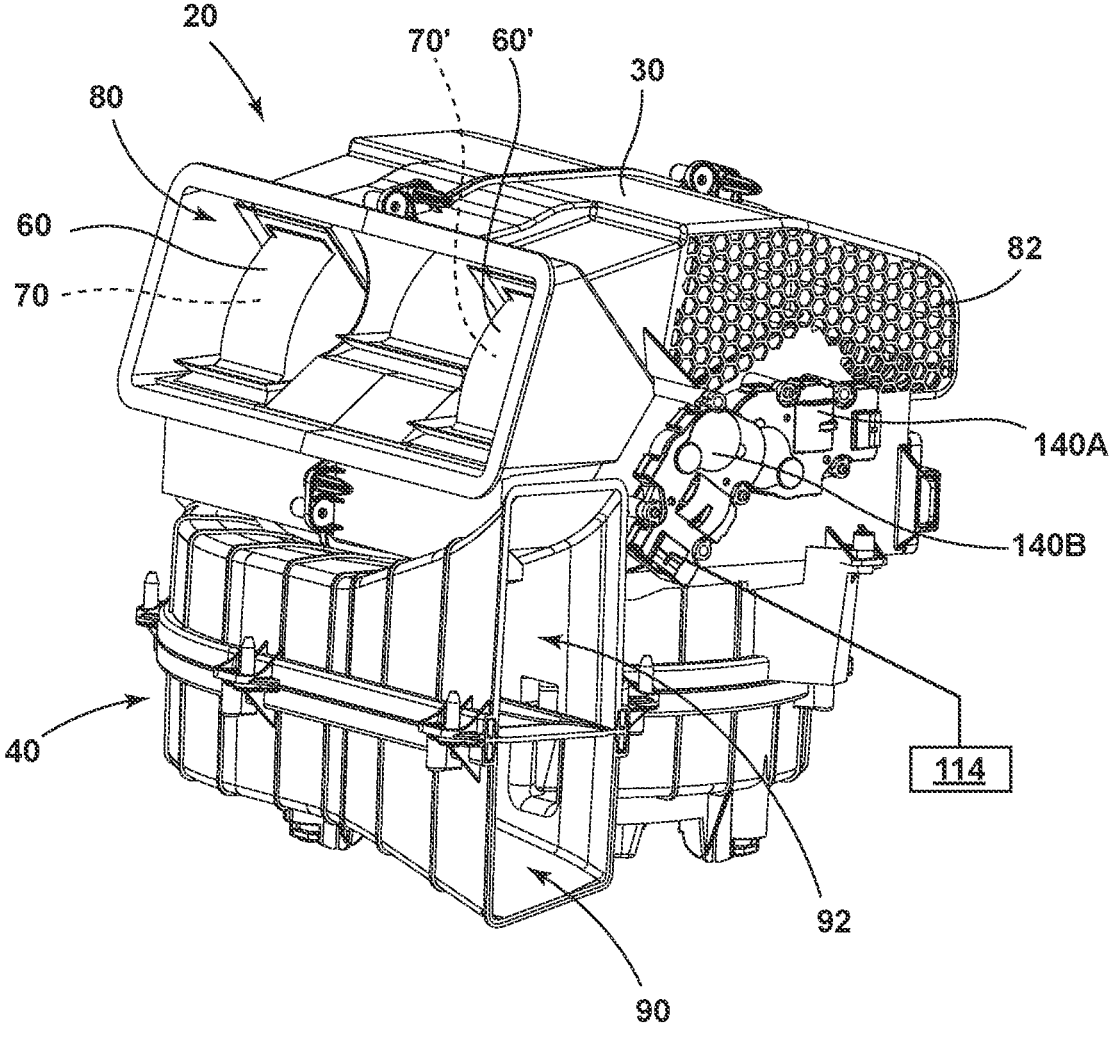
FIG. 2 is a perspective view generally illustrating an embodiment of an HVAC module according to teachings of the present disclosure.
Figure 3:
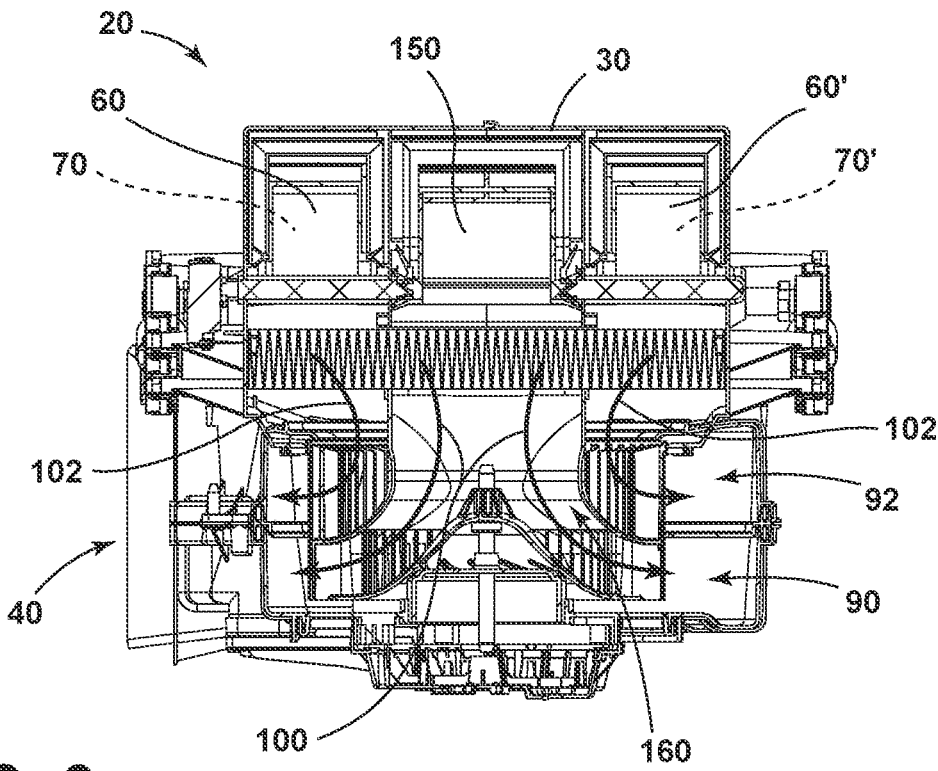
FIG. 3 is a cross-sectional front view generally illustrating an embodiment of an HVAC module according to teachings of the present disclosure.
Figure 4:
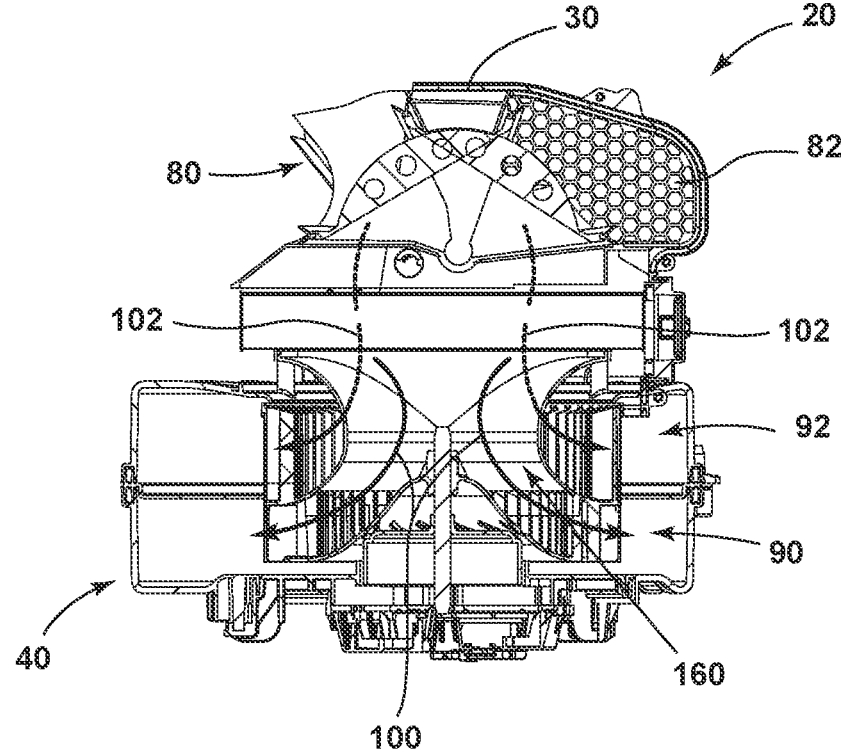
FIG. 4 is a cross-sectional side view generally illustrating an embodiment of an HVAC module according to teachings of the present disclosure.

FIGS. 1-7 present a heating, ventilation, and air conditioning (HVAC) module 20 including an air inlet 30, a blower 40, a first valve 50, a second valve 60, and a third valve 70. The air inlet 30 includes a first inlet portion 80 configured to receive a first input air (e.g., air from outside of vehicle) and a second inlet portion configured 82 to receive a second input air (e.g., recirculation air from inside of vehicle). The blower 40 is in communication with the air inlet 30. The blower 40 includes a first airflow section 90 and a second airflow section 92. Referring now to FIGS. 3 and 4, the first valve 50 is disposed at least partially in the air inlet 30 and is configured to control flow of the first input air and the second input air (e.g., air flow 100) through the first airflow section 90. The second valve 60 is disposed adjacent to the first valve 50 and configured to control flow of the first input air and the second input air (e.g., air flow 102) through the second airflow section 92. The third valve 70 is disposed in the second valve 60 and is configured to selectively restrict leakage of the first input air into the first airflow section 90.

Figure 5:
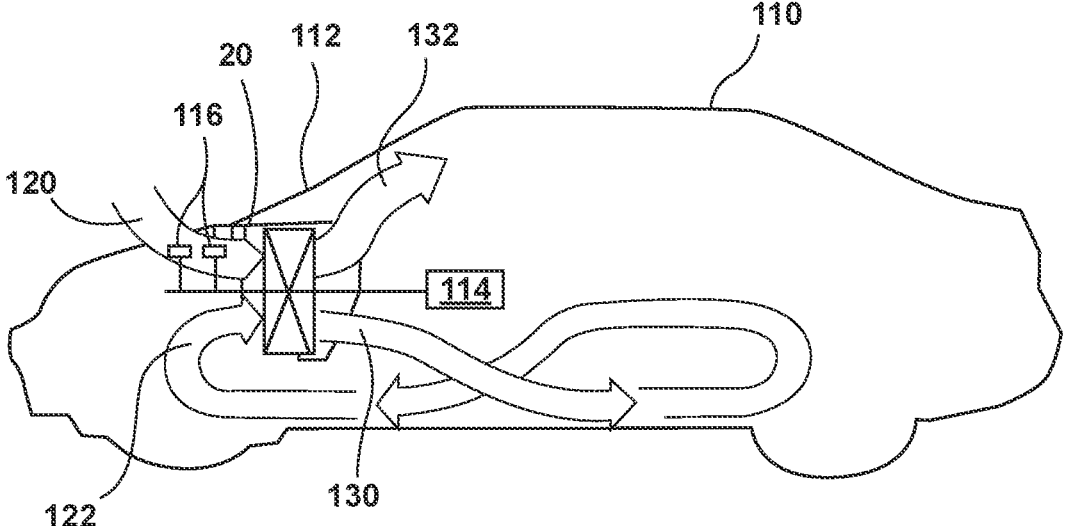
FIG. 5 is a schematic generally illustrating an embodiment of an HVAC module according to teachings of the present disclosure.
Figure 6:
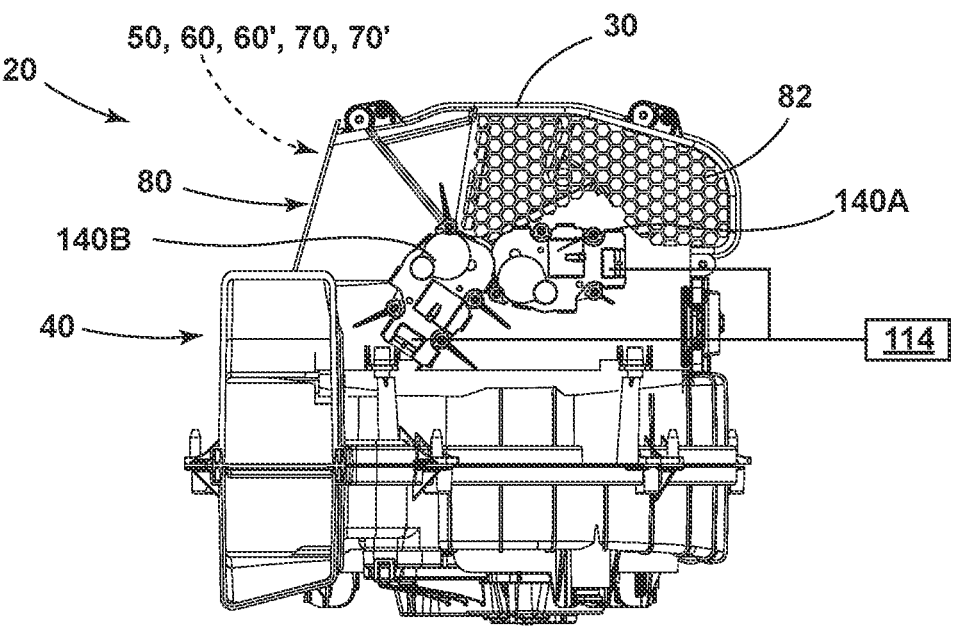
FIGS. 6 and 7 are side views generally illustrating an embodiment of an HVAC module according to teachings of the present disclosure.
Figure 7:
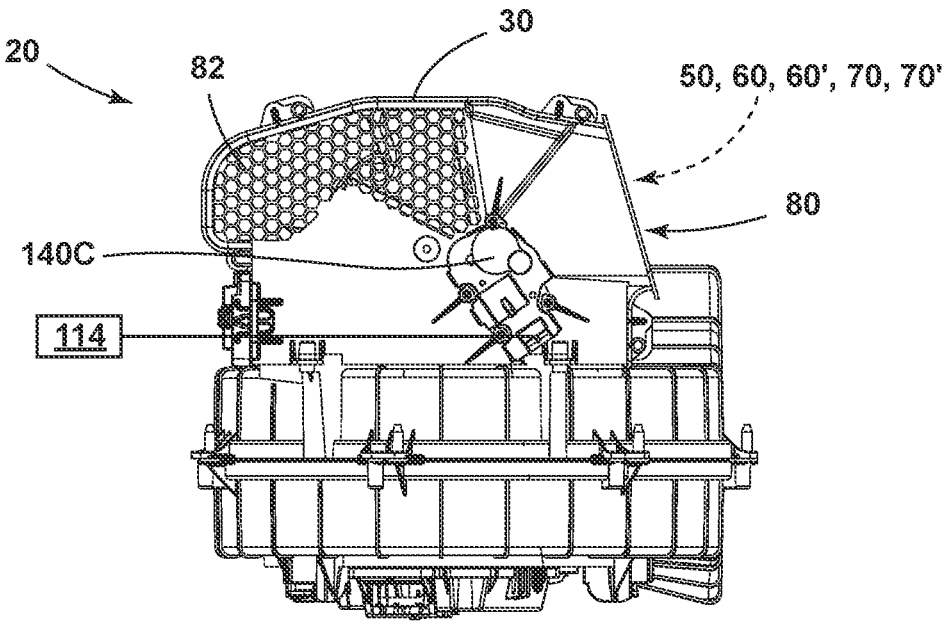

FIG. 5 presents the module 20 disposed in a vehicle 110. The module 20 is configured to selectively output air received from outside of the vehicle 110 and/or selectively output recirculation air received from inside the vehicle 110. For instance, the module 20 is configured to receive a first input air 120 (e.g., via the first inlet portion 80) and a second input air 122 (e.g., via the second inlet portion 82). The first input air 120 includes air from outside of the vehicle 110 and the second input air 122 includes recirculation air from inside the vehicle 110. The module 20 is configured to output a first output air 130 (e.g., via the blower 40) to a lower portion of the inside of the 110. The first output air 130 includes air from outside of the vehicle 110 and/or recirculation air from inside the vehicle 110. The module 20 is configured to output a second output air 132 to an upper portion of the inside of the vehicle 110 and/or to a windshield 112 of the vehicle 110. The second output air 132 includes air from outside of the vehicle 110 and/or recirculation air from inside the vehicle 110. The first output air 130 flows from first airflow section 90 of the blower 40 and the second output air 132 flows from the second airflow section 92 of the blower 40.

In some example configurations, the module 20 is electrically connected to a controller 114 and/or one or more sensors 116. The controller 114 is electrically connected to the sensors 116. A sensor 116 includes a temperature sensor and/or a pressure sensor, among others. The sensors 116 are disposed proximate a cowl of the vehicle and/or the air inlet 30. The sensors 116 and/or the controller 114 are configured to determine the temperature and/or the pressure of the first input air 120. The controller 114 is configured to control operation of the module 20. For instance, the module 20 includes a plurality of operations modes. In some example configurations, the controller 114 is configured to operate the module 20 in a certain operation mode based at least in part on information received from the sensors 116.

A vehicle 110 may include one or more of a variety of configurations. For example and without limitation, a vehicle 110 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others.

Figure 9:
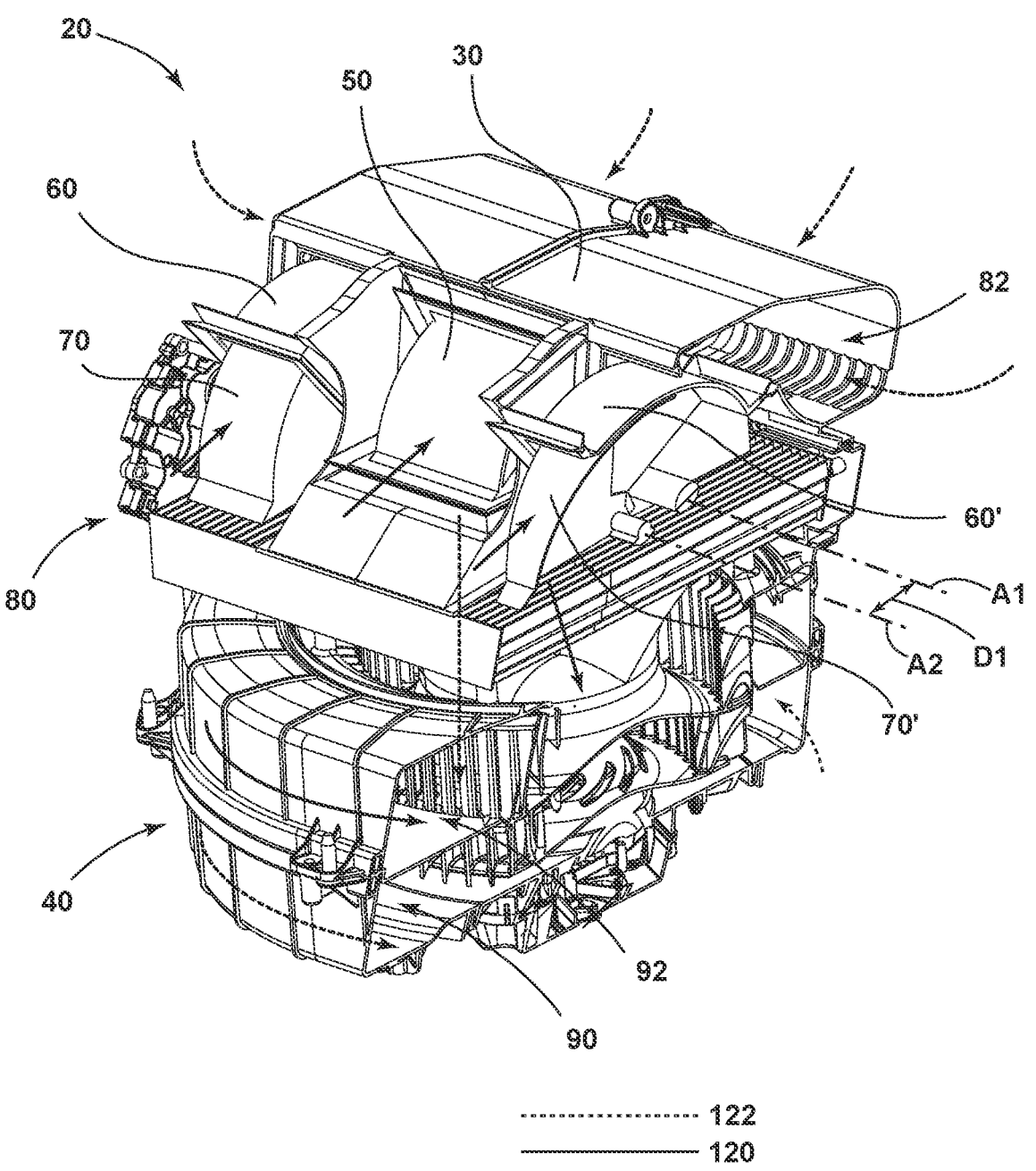
Figure 11:
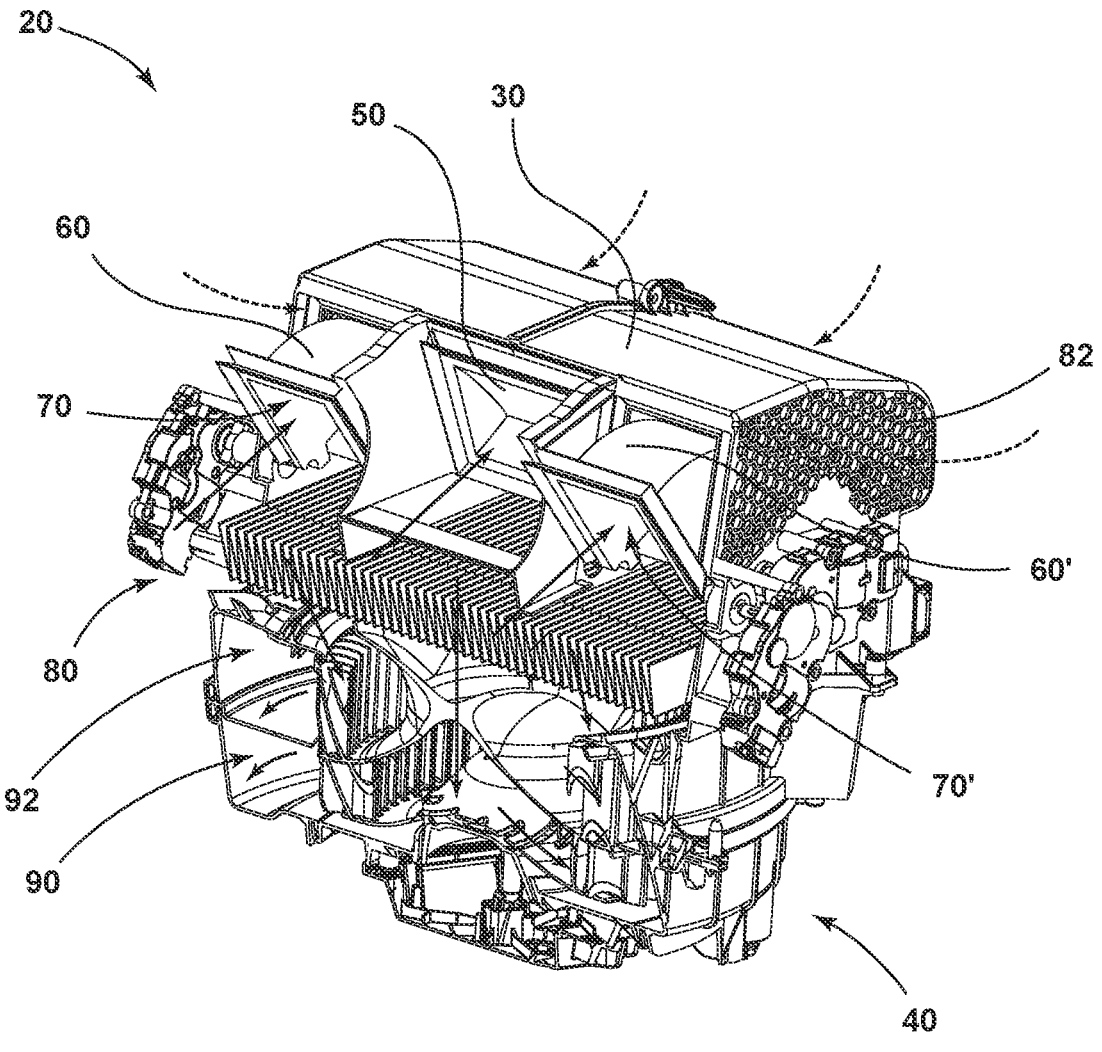

With reference to FIGS. 9 and 11, the first valve 50 (e.g., a lower airflow valve) is configured to be in various configurations such as an open configuration (see, e.g., FIG. 9) and/or a closed configuration (see, e.g., FIG. 11), among others. In some examples, the first valve 50 is configured to rotate about a first axis A1, for example and without limitation, between the open configuration and the closed configuration. A controller 114 is configured to control the operation and/or movement of the first valve 50. For instance, the first valve 50 is connected to a motor 140A that is configured to drive the movement of the first valve 50 (see, e.g., FIG. 1). The motor 140A is electrically connected to the controller 114. In accordance with the first valve 50 being in the open configuration, the first input air 120 is restricted from flowing through the first airflow section 90 of the blower 40 and the second input air 122 is permitted to flow through the first airflow section 90. In accordance with the first valve 50 being in the closed configuration, the first input air 120 is permitted to flow through the first airflow section 90 and the second input air 122 is restricted from flowing through the first airflow section 90. While the module 20 is generally illustrated as including one first valve 50, the module 20 may include more or less than one first valve 50.

Figure 12:
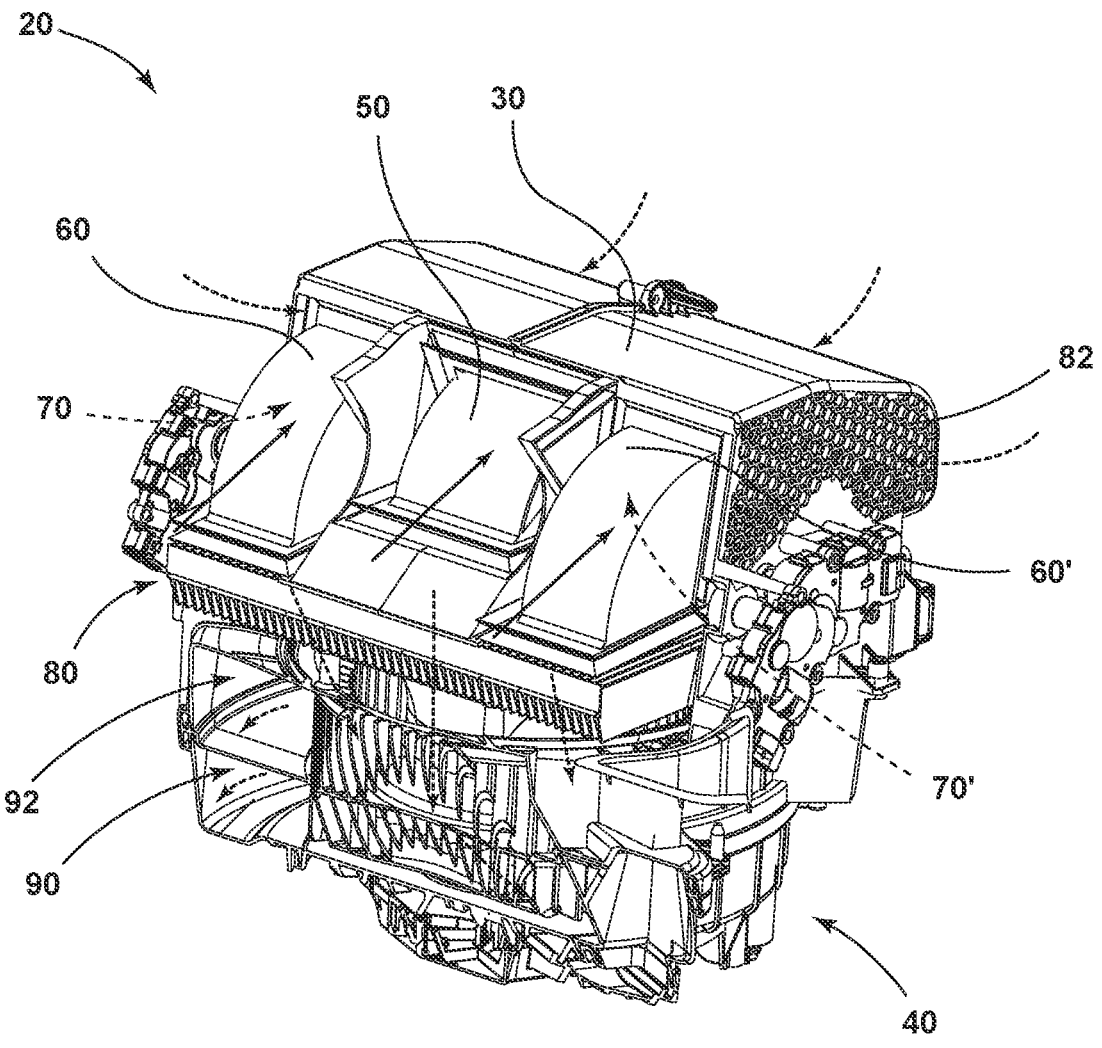

With reference to FIGS. 9 and 12, the second valve 60 (e.g., an upper airflow valve) is configured to be in various configurations such as an open configuration (see, e.g., FIG. 9) and/or a closed configuration (see, e.g., FIG. 12), among others. In some examples, the second valve 60 is configured to rotate about a second axis A2, for example and without limitation, between the open configuration and the closed configuration. The second axis A2 is offset from the first axis A1 by a distance D1 (see, e.g., FIG. 9). A controller 114 is configured to control the operation and/or movement of the second valve 60. For instance, the second valve 60 is connected to a motor 140C that is configured to drive the movement of the second valve 60 (see, e.g., FIG. 1). The motor 140C is electrically connected to the controller 114. In accordance with the second valve 60 being in the open configuration, the first input air 120 is permitted to flow through the second airflow section 92 of the blower 40 and the second input air 122 is restricted from flowing through the second airflow section 92. In accordance with the second valve 60 being in the closed configuration, the first input air 120 is restricted from flowing through the second airflow section 92 and the second input air 122 is permitted to flow through the second airflow section 92.

In some example configurations, the module 20 includes an additional second valve 60'. In some implementations, the first valve 50 is disposed between the second valve 60 and the additional second valve 60'. A controller 114 is configured to control the operation and/or movement of the additional second valve 60'. For instance, the additional second valve 60' is connected to a motor 140B that is configured to drive the movement of the additional second valve 60'. The motor 140B is electrically connected to the controller 114. While the module 20 is generally illustrated as including two second valves 60, the module 20 may include more or less than two second valves 60.

Figure 10:
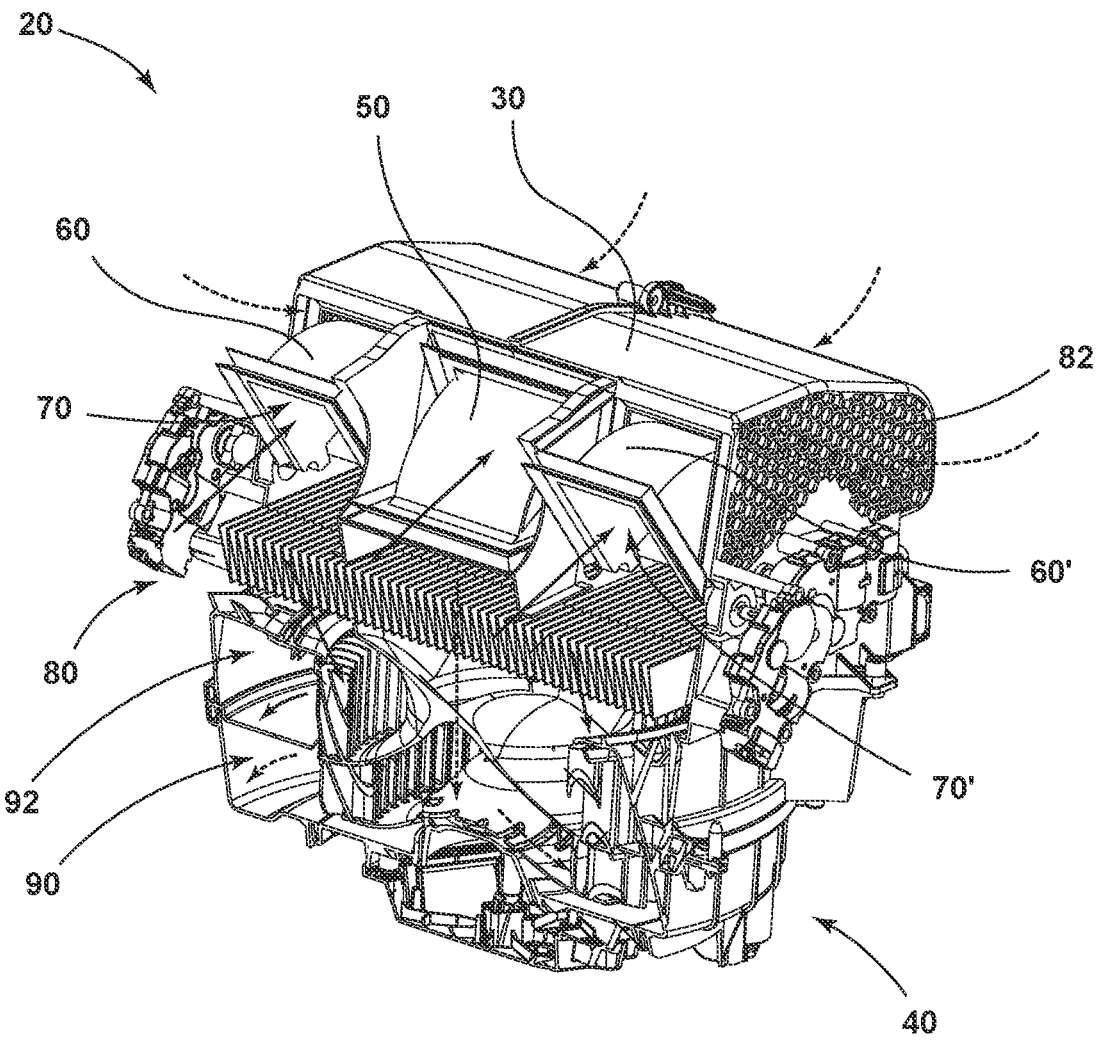

With reference to FIGS. 9, 10, and 12, the third valve 70 (e.g., a RAM air compensation valve) is configured to be in various configurations such as an open configuration (see, e.g., FIG. 10), a closed configuration (see, e.g., FIG. 12), and/or an overtravel configuration (see, e.g., FIG. 9), among others. In some examples, an overtravel configuration is a position of the third valve 70 rotated past the open configuration. In some examples, the third valve 70 is configured to rotate about the second axis A2, for example and without limitation, amongst the open configuration, the closed configuration, and the overtravel configuration. A controller 114 is configured to control the operation and/or movement of the third valve 70. For instance, the third valve 70 is connected to a motor 140C that is configured to drive the movement of the third valve 70 (see, e.g., FIG. 1). The motor 140C is electrically connected to the controller 114. The third valve 70 is configured to compensate for high air pressure (e.g., >50 Pa), for example and without limitation, in a cowl of the vehicle 110 and/or in the air inlet 30 such as to restrict undesirable leakage of the first input air 120 into the first airflow section 90 of blower 40 during certain operating conditions of the vehicle 110 (e.g., in accordance with the vehicle 110 moving at high speed with cold outside temperature, etc.).

In some example configurations, the module 20 includes an additional third valve 70'. In some implementations, the additional third valve 70' is disposed in the additional second valve 60'. A controller 114 is configured to control the operation and/or movement of the additional third valve 70'. For instance, the additional third valve 70' is connected to a motor 140B that is configured to drive the movement of the additional third valve 70'. The motor 140B is electrically connected to the controller 114. While the module 20 is generally illustrated as including two third valves 70, the module 20 may include more or less than two third valves 70.

Referring again to FIG. 1, in some instance, the module 20 includes a filter 150 and a funnel 160. The filter 150 is disposed between the air inlet 30 and blower 40. The filter 150 is configured to remove and/or collect impurities in the first input air 120 and/or the second input air 122. The funnel 160 is disposed in the blower 40 and configured to separate the first airflow section 90 from the second airflow section 92.

Previous HVAC modules do not compensate for vehicles that generate high input air pressures (e.g., >50 Pa) in a cowl of a vehicle and/or an air inlet of a module. In some examples, the input air pressure is function of vehicle speed. For instance, as vehicle speed increases so does the input air pressure. As the vehicle is exposed to cold outside temperature (e.g., about 0° C. or less) it is desirable to output from an HVAC module recirculation air received from the cabin of the vehicle back into a lower portion of the cabin such that there is less strain on a battery of the vehicle and/or on additional components of an HVAC system (e.g., heater, etc.) such as to heat the outputted air. Heating cold outside air is draining on the battery and/or on the additional components of the HVAC system.

Figure 8:
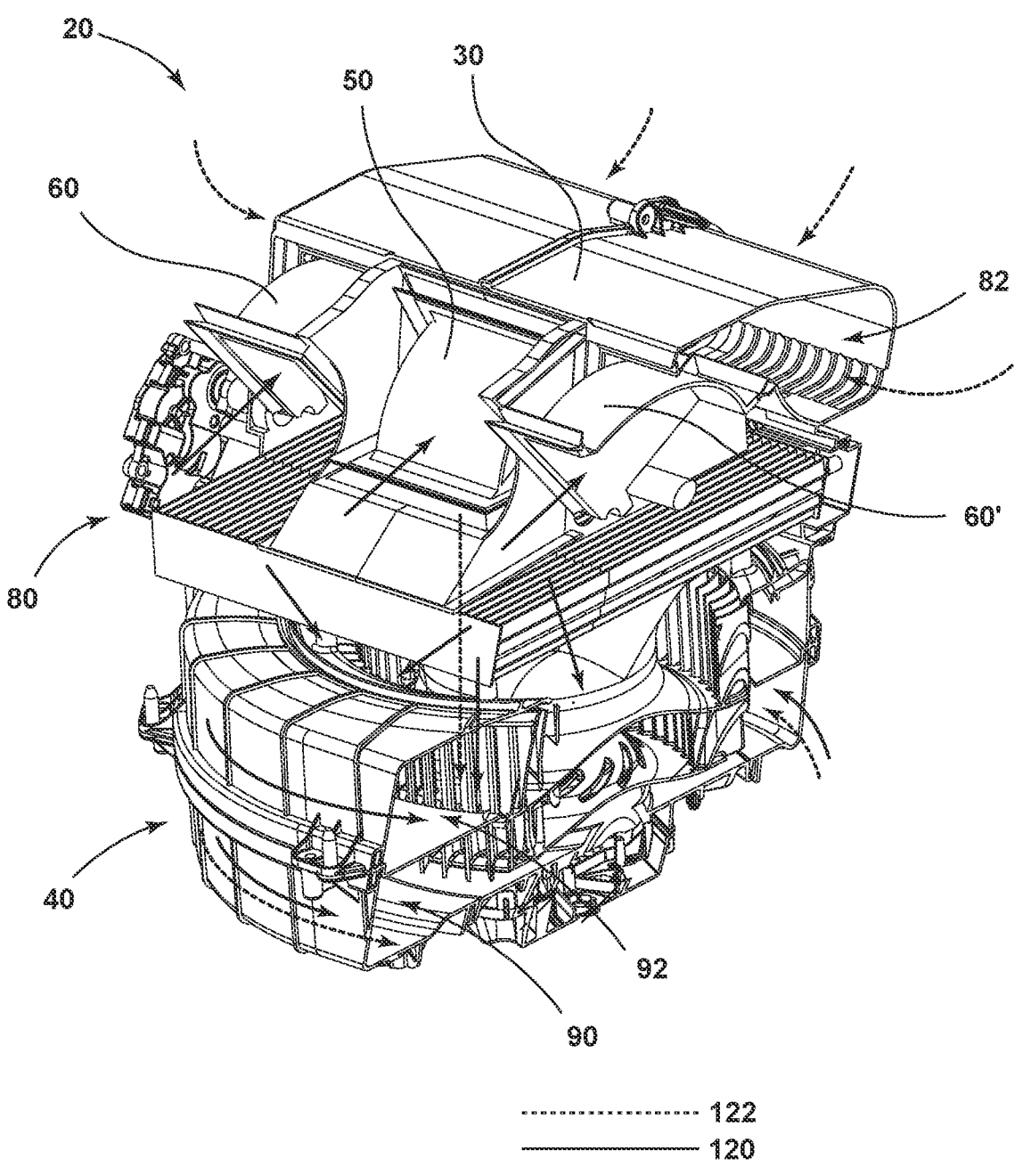
FIGS. 8-12 are cross-sectional perspective views generally illustrating embodiments of operation modes of an HVAC module according to teachings of the present disclosure.

In connection with the previous HVAC modules, an undesirable phenomenon occurs when a vehicle is exposed to cold outside temperature and is traveling at a rate of speed, for example and without limitation, of about 40 mph or greater. The cowl of the vehicle and/or the inlet of a HVAC module is exposed to higher pressure which may cause the cold outside air to be leaked from the module and into the cabin of the vehicle causing an uncomfortable experience for passengers of the vehicle. FIG. 8 illustrates the foregoing phenomenon.

With reference to FIG. 8, a module 20 without third valves 70 is shown. In accordance with a vehicle being exposed to cold outside temperature and traveling at a rate of speed, for example and without limitation, of about 40 mph or greater, the first input air 120 (e.g., air from outside of the vehicle) may leak into the first airflow section 90 of the blower 40 and into the cabin of the vehicle causing an unpleasant experience for the passengers and/or causing strain on the battery and/or additional components of an HVAC system.

Referring now to FIGS. 5 and 9, the module 20 includes an operation mode configured to compensate for high air pressure (e.g., >50 Pa) in a cowl of vehicle 110 and/or the air inlet 30 such as to restrict leakage of the first input air 120 into the first airflow section 90 of blower 40. In some implementations, the controller 114 is configured to operate the module 20 in the high air pressure operation mode based in part via information collected from the sensors 116. In accordance with the module 20 being in the high air pressure operation mode, the first valve 50 is in an open configuration, the second valve 60 and the additional valve 60' are in open configurations, and the third valve 70 and the additional third valve 70' are in overtravel configurations and/or closed configurations. A clearance space is arranged about the third valve 70 and the additional third valve 70' to reduce pressure within the air inlet 30 while allowing the first input air 120 to flow into the second airflow section 92 of the blower 40. In the high air pressure operation mode, the first output air 130 includes recirculation air and the second output air 132 includes air from outside of the vehicle 110. In some examples, it is desirable for the second output air 132 to include dry outside air such as to help facilitate the defogging of the windshield 112.

With reference to FIGS. 5 and 10, the module 20 includes an operation mode for low air pressure (e.g., <50 Pa) in the air inlet 30 (e.g., vehicle traveling at low speed). In some implementations, the controller 114 is configured to operate the module 20 in the low air pressure operation mode based in part via information collected from the sensors 116. In accordance with the module 20 being in the low air pressure operation mode, the first valve 50 is in an open configuration, the second valve 60 and the additional second valve 60' are in open configurations, and the third valve 70 and the additional third valve 70' are in open configurations. In the low air pressure operation mode, the first output air 130 includes recirculation air and the second output air 132 includes air from outside of the vehicle 110.

Referring now to FIGS. 5 and 11, the module 20 includes an outside air operation mode. In some instances, it may be desirable to only output air received from outside of the vehicle 110 from the module 20. In accordance with the HVAC being in the outside air operation mode, the first valve 50 is in a closed configuration, the second valve 60 and the additional second valve 60' are in open configurations, and the third valve 70 and the additional third valve 70' are in open configurations. In the outside air operation mode, the first output air 130 includes air from outside of the vehicle and the second output air 132 includes air from outside of the vehicle 110.

With reference to FIGS. 5 and 12, the module 20 includes a recirculation operation mode. In some instances, it may be desirable to only output recirculation air received from inside of the vehicle from the module 20. In accordance with the module 20 being in the recirculation operation mode, the first valve 50 is in an open configuration, the second valve 60 and the additional second 60' are in closed configurations, and the third valve 70 and the additional third valve 70' are in closed configurations. In the recirculation operation mode, the first output air 130 includes recirculation air and the second output air 132 includes recirculation air.

In examples, a controller (e.g., controller 114) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples." "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, left-ward, rightward, top, bottom, above, below, vertical, hori-zontal, clockwise, and counterclockwise) are only used for identification purposes to aid the reader's understanding of the present disclosure, and do not create limitations, par-ticularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describ-ing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes." "including." "comprises." and/or "comprising." when used in this speci-fication, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connec-tions, operative connections, indirect contact, and/or direct contact. As such, joinder references do not necessarily imply that two elements are directly connected/coupled and in fixed relation to each other. Connections of electrical com-ponents, if any, may include mechanical connections, elec-trical connections, wired connections, and/or wireless con-nections, among others. Uses of "e.g." and "such as" in the specification are to be construed broadly and are used to provide non-limiting examples of embodiments of the dis-closure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting." depending on the context. Simi-larly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustra-tive only and not limiting. Changes in detail or structure may be made without departing from the present disclosure.

It should be understood that a controller, a system, and/or a processor as described herein may include a conventional processing apparatus known in the art, which may be capable of executing preprogrammed instructions stored in an associated memory, all performing in accordance with the functionality described herein. To the extent that the meth-ods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manu-facture in accordance with this disclosure may include a non-transitory computer-readable storage medium having a computer program encoded thereon for implementing logic and other functionality described herein. The computer program may include code to perform one or more of the methods disclosed herein. Such embodiments may be con-figured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A heating, ventilation, and air conditioning (HVAC) module, comprising:
   an air inlet including a first inlet portion configured to receive a first input air and a second inlet portion configured to receive a second input air;
   a blower in communication with the air inlet, the blower including a first airflow section and a second airflow section;
   a first valve disposed at least partially in the air inlet and configured to control flow of the first input air and the second input air through the first airflow section;
   a second valve disposed adjacent to the first valve and configured to control flow of the first input air and the second input air through the second airflow section; and
   a third valve disposed in the second valve and configured to selectively restrict leakage of the first input air into the first airflow section.

2. The HVAC module of claim 1, wherein:
   the first valve is configured to be in an open configuration and a closed configuration;
   in accordance with the first valve being in the open configuration, the first input air is restricted from flow-ing through the first airflow section and the second input air is permitted to flow through the first airflow section; and in accordance with the first valve being in the closed configuration, the first input air is permitted to flow through the first airflow section and the second input air is restricted from flowing through the first airflow section.

3. The HVAC module of claim 2, wherein the first valve is configured to rotate between the opened configuration and the closed configuration.

4. The HVAC module of claim 1, wherein:

the second valve is configured to be in an open configuration and a closed configuration;

in accordance with the second valve being in the open configuration, the first input air is permitted to flow through the second airflow section and the second input air is restricted from flowing through the second airflow section; and in accordance with the second valve being in the closed configuration, the first input air is restricted from flowing through the second airflow section and the second input air is permitted to flow through the second airflow section.

5. The HVAC module of claim 4, wherein the second valve is configured to rotate between the opened configuration and the closed configuration.

6. The HVAC module of claim 1, wherein the first valve is configured to rotate about a first axis; and the second valve and the third valve are configured to rotate about a second axis.

7. The HVAC module of claim 6, wherein the first axis is offset from second axis.

8. The HVAC module of claim 1, wherein the third valve is configured to be in an open configuration, a closed configuration, and an overtravel configuration.

9. The HVAC module of claim 8, wherein the third valve is configured to rotate amongst the opened configuration, the closed configuration, and the overtravel configuration.

10. The HVAC module of claim 1, wherein the third valve is configured to compensate for high air pressure in the air inlet to restrict undesirable leakage of the first input air into the first airflow section.

11. The HVAC module of claim 1, including an additional second valve.

12. The HVAC module of claim 11, wherein the first valve is disposed between the second valve and the additional valve.

13. The HVAC module of claim 11, including an additional third valve;

wherein the additional third valve is disposed in the additional second valve.

14. The HVAC module of claim 1, including:

a filter disposed between the air inlet and the blower; and a funnel disposed in the blower and configured to separate the first airflow section from the second airflow section.

15. The HVAC module of claim 1, wherein, when the HVAC module is in an operation mode associated with high air inlet pressure:

the first valve is in an open configuration;

the second valve is in an open configuration; and the third valve is in an overtravel configuration.

16. The HVAC module of claim 1, wherein, when the HVAC module is in an operation mode associated with low air inlet pressure:

the first valve is in an open configuration;

the second valve is in an open configuration; and the third valve is in an open configuration.

17. The HVAC module of claim 1, wherein, when the HVAC module is in an outside air operation mode:

the first valve is in a closed configuration;

the second valve is in an open configuration; and the third valve is in an open configuration.

18. The HVAC module of claim 1, wherein, when the HVAC module is in a recirculation operation mode:

the first valve is in an open configuration;

the second valve is in a closed configuration; and the third valve is in a closed configuration.

19. A vehicle, comprising:

the HVAC module of claim 1;

wherein the first input air includes air from outside of the vehicle; and the second input air includes recirculation air from inside of the vehicle.

20. The vehicle of claim 19, wherein the blower is configured to output a first output air to a lower portion of the inside of the vehicle;

the first output air flows from first airflow section of the blower;

the blower is configured to output a second output air to at least one of an upper portion of the inside of the vehicle and a windshield of the vehicle; and the second output air flows from the second airflow section of blower.

* * * * *